US008404194B2

(12) United States Patent
Saxena et al.

(10) Patent No.: US 8,404,194 B2
(45) Date of Patent: Mar. 26, 2013

(54) BLOOD SEPARATION MEDIA

(75) Inventors: Abhishek D. Saxena, Somersworth, NH (US); John C. Ramsay, Boiling Springs, PA (US)

(73) Assignee: Lydall, Inc. (JP)

( * ) Notice: Subject to any disclaimer, the term of this patent is extended or adjusted under 35 U.S.C. 154(b) by 323 days.

(21) Appl. No.: 12/491,891

(22) Filed: Jun. 25, 2009

(65) Prior Publication Data

US 2009/0325143 A1 Dec. 31, 2009

Related U.S. Application Data

(60) Provisional application No. 61/076,036, filed on Jun. 26, 2008.

(51) Int. Cl.
*B01D 21/00* (2006.01)

(52) U.S. Cl. ........ 422/534; 422/500; 422/527; 210/314; 210/315; 210/500.26; 210/503; 210/505

(58) Field of Classification Search .................. 422/500, 422/527, 534; 210/314, 315, 500.26, 503, 210/505
See application file for complete search history.

(56) References Cited

U.S. PATENT DOCUMENTS 4,058,463 A * 11/1977 Bartik ........................... 210/317

* cited by examiner

*Primary Examiner* — Jill Warden
*Assistant Examiner* — Monique Cole
(74) *Attorney, Agent, or Firm* — Cantor Colburn LLP

(57) ABSTRACT

Disclosed is a separation media, comprising an upstream layer, comprising fibers, wherein the upstream layer has a mean flow pore size of 8 microns or less; and a downstream layer, comprising fibers. The separation media is designed to separate red blood cells from liquid specimens such as blood and allow a filtrate, such as blood plasma, to flow from said downstream layer. Also provided is a diagnostic test device incorporating the separation media. Further disclosed is a method for separating red blood cells from a liquid specimen.

10 Claims, 1 Drawing Sheet

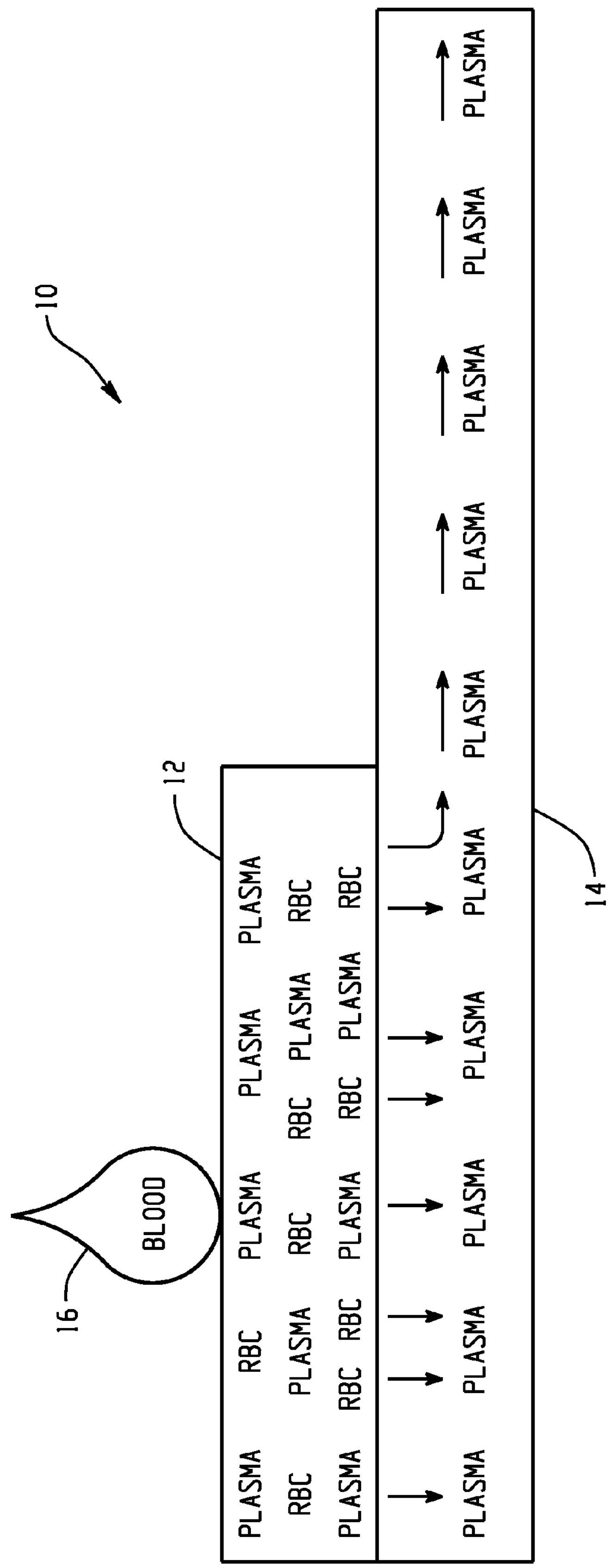
10
12
14
16
BLOOD
PLASMA
RBC

BLOOD SEPARATION MEDIA

This Nonprovisional application claims priority under 35 U.S.C. §119(e) on U.S. Provisional Application No(s). 61/076,036 filed on Jun. 26, 2008, the entire contents of which are hereby incorporated by reference.

SUMMARY OF THE INVENTION

Disclosed herein is a blood separation media. This media is suitable as part of a blood diagnostic test device. The separation media comprises two layers capable of separating red blood cells (RBCs) from the remainder of the blood and plasma. This is accomplished with no hemolysis, uniform thickness of media, a high yield of the fluid fraction of plasma, rapid absorption of blood and suitable across a range of hematocrits. The separation media has enough capillary action within the matrix of the media so that the separated serum or plasma flows to the reaction site on the ultimate test strip for the diagnostic test to occur.

BACKGROUND OF THE INVENTION

The concept of blood separation is known and several methods and materials are available to accomplish such separation. For instance, wet-laid technology utilizes essentially single layers with a blend of natural and man made fibers. Exemplary are single layer blood separation media utilizing composites such as glass microfibers, cellulose fibers, and synthetic textile fibers. Membrane technology can utilize a graduated pore structure from upstream to downstream for effective RBC separation. Blood separation media made of non-woven webs of fibrillated and non-fibrillated synthetic staple fibers are also known.

Known techniques have drawbacks including undesirable hemolysis, non-uniform thickness of media, low yields of the fluid fraction of plasma, slow absorption of blood, and unsuitability across a range of hematocrits.

SUMMARY OF THE INVENTION

One object is to provide a separation media, comprising an upstream layer, comprising fibers, wherein said upstream layer has a mean flow pore size of 8 microns or less, and a downstream layer, comprising fibers, wherein said downstream layer is designed to allow for flow of fluids therethrough, wherein said upstream layer and said downstream layer overlap each other.

In one embodiment, one or both of said upstream layer and said downstream layer comprise microglass fibers.

In another embodiment, one or both of said upstream layer and said downstream layer is substantially free of binder, for instance, organic binder.

In yet another embodiment, the separation media of claim 1, wherein said media is capable of removing red blood cells from a liquid specimen, such as blood. Preferably, the red blood cells are removed without being ruptured.

In another embodiment, when a liquid specimen containing red blood cells is applied to said upstream layer, substantially all of said red blood cells will be prevented from flowing into said downstream layer. In yet another embodiment, after substantially all of said red blood cells are prevented from flowing into said downstream layer, a filtrate of said liquid specimen flows at a predetermined rate and volume into and through said downstream layer.

In another embodiment, the liquid specimen comprise blood and the filtrate comprises blood plasma.

Another embodiment of the invention relates to a diagnostic test device, comprising the separation media of claim 1; and a diagnostic device attached to said separation media, wherein said separation media separates red blood cells from a liquid specimen allowing a filtrate to flow from said downstream layer to said diagnostic device.

Another embodiment of the invention relates to a method for separating red blood cells from a liquid specimen, comprising: applying said specimen containing red blood cells to the separation media of claim 1, whereby said red blood cells are prevented from flowing through said media and a filtrate of said specimen flows from said downstream layer.

BRIEF DESCRIPTION OF THE DRAWINGS

The FIGURE illustrates a cross sectional view of the blood separation media in accordance with an embodiment of the present disclosure.

DETAILED DESCRIPTION OF THE INVENTION

The present blood separation media comprises a dual layer system. This system is suited to be a part of a diagnostic test strip; however, other uses will become evident to those of ordinary skill. One role of the separation media is to separate the red blood cells (RBC) or erythrocytes from the whole blood. Another role of the separation media is to have enough capillary action within the matrix of the media so that the separated serum or plasma flows to the reaction site on the test strip for the diagnostic test to occur.

One advantage of the present blood separation media is a decrease in rupture (hemolysis) of the RBCs as compared to some other blood separation media. Too much hemolysis can make the plasma appear red instead of clear/yellowish in color. Such a red color can, in some instances, be disadvantageous since the result of the test strip cannot be visualized, especially when the test indicator is a change in color of the test strip. Such a change in color can be overrun by the red color released from excessive hemolysis.

Other variables which can influence the performance of blood separation media are the distance traveled by the whole blood and resulting serum, the time taken to absorb the blood and protein binding on the surface of the media.

A goal, but not a necessity of the present invention is to improve one or more of the above issues with respect to other separation media. It is not necessary to accomplish any of the above improvements, but a goal is to accomplish one or more of the above improvements.

Blood Separation Media Having at Least Two Layers

Referring now to the FIGURE, the present blood separation media is a system generally designated by reference numeral 10 comprising at least two layers (at least a upstream layer 12 and a downstream layer 14). However, additional layers may be incorporated as desired. These layers may be formed from any conventional material; however, microglass is particularly suitable. During use, blood droplets 16 are applied to the upstream layer 12 where the red blood cells (RBC) are prevented from flowing to the downstream layer 14. However, the plasma via capillary action flows from the upstream layer 12 to the downstream layer 14.

The upstream and downstream layers are designed to overlap one another. However, it is possible for the upstream layer to be the same, larger or smaller in surface area as compared to the downstream layer. The upstream and downstream layers may have a combined thickness of from about 15 mils at 8 psi to about 28 mils at 8 psi.

Microglass is a common fiber in wet-laid blood separator media. The media is preferably substantially free of binders, such as organic binders. This is preferred in order to prevent any substantial reaction between the blood components and other chemicals put on the test strip of blood separation media. Therefore, it is preferred to select a bicomponent fiber to provide the necessary strength to the media. The bicomponent fiber, AL Adhesion C, has a core and a sheath containing polypropylene and polyester. Although microglass fibers are discussed herein, any other materials, including fibers, may be suitable. Preferably, other materials should have a mean flow pore size and distribution of pores that are substantially similar or comparable to separation media prepared with microglass.

Upstream Layer

The upstream layer of the separation media is intended to receive the blood specimen. Although additional layers may exist on top of the "upstream" layer, they should not substantially interfere with the operation of the "upstream" layer discussed herein. A primary goal of the upstream layer is to prevent the movement of RBCs to the downstream layer.

RBC's are typically 6-8 microns in size. For optimal blood separation, the entire media should substantially stop the flow of RBCs through the plane of the sheet(s) and in the plane of the sheet(s) and allow in-plane or lateral flow of plasma/serum through the matrix of sheet(s). The stopping of the flow of RBCs is preferably substantially accomplished by the upstream layer; however, applications may be envisioned where the flow is stopped by more than just the upstream layer. One possible goal is to prevent RBCs from reaching any ultimate test strip.

To this end, the upstream layer may have a mean flow pore (MFP) size having an upper limit of one of about 8, 7, 6, 5, 4, 3 and 2 microns. Concerning a bottom limit to the MFP size of the upstream layer, it is preferred to not restrict the flow of the plasma. However, understanding that RBCs are flexible, the MFP size may be small enough to substantially restrict the through plane flow of RBCs.

The upstream layer may have a basis weight of about 5-40, preferably about 11-30, more preferably about 15 lbs/3000 $ft^2$.

Downstream Layer

The downstream layer of the separation media is intended to receive the plasma fraction or filtrate from the upstream layer. Although additional layers may exist, they should not substantially interfere with the operation of the "downstream" layer discussed herein.

The downstream layer may allow in-plane or lateral flow of plasma/serum through the matrix of sheet(s). The composition of the downstream layer may be optimized based upon consumer criteria. It will become evident that one or more goals may be accomplished by the downstream layer. For instance, the downstream layer may provide one or more of (1) strength to the separation media, (2) allow sufficient flow of plasma to the test strip, (3) control the speed of flow of the plasma to the test strip, and (4) any further separation of remaining RBCs. To this end, the downstream layer may have a MFP size to allow one or more of the above criteria. The gradient in pore size may increase or decrease from upstream to downstream.

The downstream layer may have a basis weight of about 20-60, preferably about 35-45, more preferably about 40 lbs/3000 $ft^2$.

Preparation of Separation Media

In a system having two layers (upstream and downstream), a dual layer capable rotoformer may be utilized to form a final two layer system.

EXAMPLE

Details of the Pilot Machine

Type—Rotoformer

Dry Paper Width—25.5 inches

Hydro pulper to disperse fibers

Flows to headbox—Machine Chest (Bottom layer) & Blend Chest (Top Layer)

Capacity—Machine Chest: 1000 gallons

Blend Chest: 1000 gallons

No. of dryer cans—10

Temperature—300 F maximum

Steam—60-80 lbs

Vacuum for suction—15-20 inches

Speed—10 fpm

Machine Chest and Blend Chest

This product is made as a dual layer sheet, which is, forming a bottom (downstream) layer and then forming a top (upstream) layer on the bottom layer. The furnish of the downstream layer is prepared in Machine chest and for the upstream layer is prepared in the Blend Chest. The flow rate is set as per the target basis weight of the two layers.

Pulping

Downstream layer: About 600 gallons of water is added to the hydropulper. Then 900 ml of sulfuric acid is added to lower the pH of the water, which helps in dispersing the fibers easily. Fibers are added next and the whole batch is pulped for 3 minutes. This batch is then dumped into the Machine Chest along with 600 gallons of dilution water.

Upstream Layer: About 600 gallons of water is added to the hydropulper. The whole batch is pulped for 3 minutes. The batch is then dumped in the Blend Chest along with 600 gallons of dilution water.

Test Run

Once the chests are filled with the pulped (dispersed fibers) they are pumped into the dual layer headbox of the paper machine. A typical paper machine will have 2-3 flows coming into a single mix-tank and the mixed flow is pumped through a fan pump and wet-laid on a forming screen/wire. The test paper machine used is a Rotoformer type. It has a cylinder with 80 mesh stainless steel wire on it and it serves as the forming wire.

After the formation the wet-laid media is passed through dryer cans dried to 99%+solids and wound on a rewinding station.

The following formulations were initially tested to provide an upstream and a downstream sheet. To better understand, the following explanations are also provided.

100, 104, 106, 108A, 108B, 110X—code 100, 104, 106, 108A, 108B, 110X, respectively, for Micro-Strand Glass Microfibers, 100 series, available from Johns Manville, Denver, Colo.

Al Adhesion—bicomponent fiber, available from ES Fibervisions, Atlanta, Ga.

MFP microns—Mean Flow Pore Diameter in microns, measured by a capillary flow porometer.

MAX Pore—Bubble point or the Max Pore Size diameter in microns, measured by capillary flow porometer.

BW—Basis Weight, measured in lbs/3000 $ft^2$.

UPSTREAM LAYER—Basis Weight 20 lbs/3000 ft$^2$

| Fiber | 1 % | 2 % | 3 % | 4 % | 5 % |
|---|---|---|---|---|---|
| 100 | — | — | — | 15 | — |
| 104 | — | 30 | — | — | 7 |
| 106 | 90 | | — | — | — |
| 108 A | — | 60 | 100 | 85 | 93 |
| 108 B | — | | — | — | — |
| Al Adhesion | 10 | 10 | — | — | — |
| MFP microns | 2.48 | 2.65 | 4.04 | 2.83 | 3.38 |
| MAX Pore | 8.59 | 10.59 | 11.05 | 7.51 | 9.47 |

DOWNSTREAM LAYER—Basis Weight 40 lbs/3000 ft$^2$

| Fiber | B3 % | B4 % | B5 % | B6 % | B5' % | B5" % | B6' % | B6" % |
|---|---|---|---|---|---|---|---|---|
| 108 A | 60 | 75 | 75 | | 75 | 75 | | |
| 108 B | — | | — | 75 | — | | 75 | 75 |
| 110 X | | | 25 | 25 | 20 | 10 | 20 | 10 |
| Al Adhesion | 40 | 25 | — | — | 5 | 15 | 5 | 15 |
| MFP microns | 4.03 | 1.57 | 3.73 | 7.168 | 4.08 | 4.26 | 8.13 | |
| MAX Pore | | | 12.36 | 14.63 | 11.01 | 11.22 | 19.52 | |

From the above formulations, three basic furnishes were selected, No. 1 in upstream layer (except that 100% of the 106 fiber was used instead of 90% 106 (again 20 BW was utilized)). Downstream layers selected were B5" and B6". These were chosen considering the pore sizes and the fact that 15% Al Adhesion C should provide enough strength to the media. The adhesion between the two layers is impacted by the amount of Al Adhesion C in the furnish.

This trial is directed towards a furnish that would work with the concept of gradient pore structure. Keeping the fiber percentage fixed for the two furnishes, the gradient in the pore structure in this trial is influenced by the BW of the two layers. Hence the BW of upstream layer decreases from 20# to 0# in the Variation Matrix and to counter that the BW of downstream layer increases from 45# to 65#.

Variation Matrix Basis Wt. #/3000 sf

| | Furnish 1 | | | |
|---|---|---|---|---|
| | V1 | V2 | V3 | V4 |
| Downstream Layer BW | 45 | 55 | 60 | 65 |
| Upstream Layer BW | 20 | 10 | 6 | 0 |

| | Furnish 2 | | | |
|---|---|---|---|---|
| | V5 | V6 | V7 | V8 |
| Downstream Layer BW | 45 | 55 | 60 | 65 |
| Upstream Layer BW | 20 | 10 | 6 | 0 |

Composition %

| Furnish | 1 | 2 |
|---|---|---|
| Downstream Layer % | | |
| 108 A | 75 | 0 |
| 108 B | 0 | 75 |
| 110 X | 10 | 10 |
| Al Adhesion C | 15 | 15 |
| Upstream Layer % | | |
| 106 | 100 | 100 |

At the start of the trial the downstream layer came in at 45#. No attempt was made to change the flow to meet the target of 40#. The upstream layer was started and the total BW was recorded. The flow changes were done as predetermined by the set up sheet and 100 ft of each variation was made. All the variations were around 64-66# in BW. Runnability of each of the variations was good with no apparent problems in threading the cans or rewinding.

| Variation | Max Pore | MFP |
|---|---|---|
| V1 | 8.6375 | 2.096 |
| V2 | 10.6515 | 2.1825 |
| V3 | 11.392 | 2.891 |
| V4 | 12.636 | 3.0395 |
| V5 | 9.376 | 2.2785 |
| V6 | 10.283 | 3.0385 |
| V7 | 15.522 | 4.486 |
| V8 | 16.775 | 5.995 |

Preparation of Test Strip

The final dual layer product (which can have more than two layers if desired) is suitable to be incorporated into a test strip. The test strip is most suitably one designed for blood. However, any liquid specimen including, but not limited to blood, plasma, serum, urine, saliva or suspensions of cellular/tissue materials, may be envisioned. Incorporation of the present blood separation media into a test strip will become evident to those of skill in the art.

The invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A blood separation media for separating blood into red blood cells and a remaining portion, comprising:

a planar upstream layer, comprising fibers, wherein said upstream layer has a mean flow pore size of 8 microns or less, wherein the upstream layer is configured to prevent passage of the red blood cells so as to separate the red blood cells via capillary action from the remaining portion; and a planar downstream layer, comprising fibers, wherein said downstream layer is designed to allow for flow of fluids therethrough, wherein said upstream layer and said downstream layer overlap each other.

2. The separation media of claim 1, wherein one or both of said upstream layer and said downstream layer comprise microglass fibers.

3. The separation media of claim 1, wherein one or both of said upstream layer and said downstream layer is substantially free of binder.

4. The separation media of claim 1, wherein said media is capable of removing red blood cells from a specimen.

5. The separation media of claim 4, wherein said specimen is blood.

6. The separation media of claim 1, wherein if a liquid specimen containing red blood cells is applied to said upstream layer, substantially all of said red blood cells will be prevented from flowing into said downstream layer.

7. The separation media of claim 6, wherein after substantially all of said red blood cells are prevented from flowing into said downstream layer, a filtrate of said liquid specimen flows at a predetermined rate and volume into and through said downstream layer.

8. The separation media of claim 6, wherein said liquid specimen comprises blood.

9. The separation media of claim 7, wherein said liquid specimen comprises blood and said filtrate comprises blood plasma.

10. The separation media of claim 6, wherein said red blood cells are not ruptured by said media.

* * * * *